Nov. 27, 1956 G. H. BUEHRING 2,772,010
STORAGE TANK TRAILER
Filed Oct. 13, 1954 2 Sheets-Sheet 2
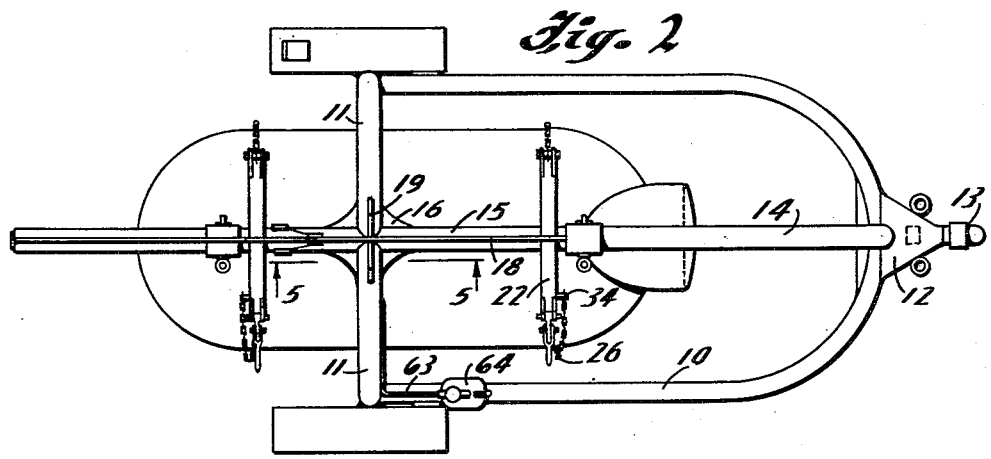
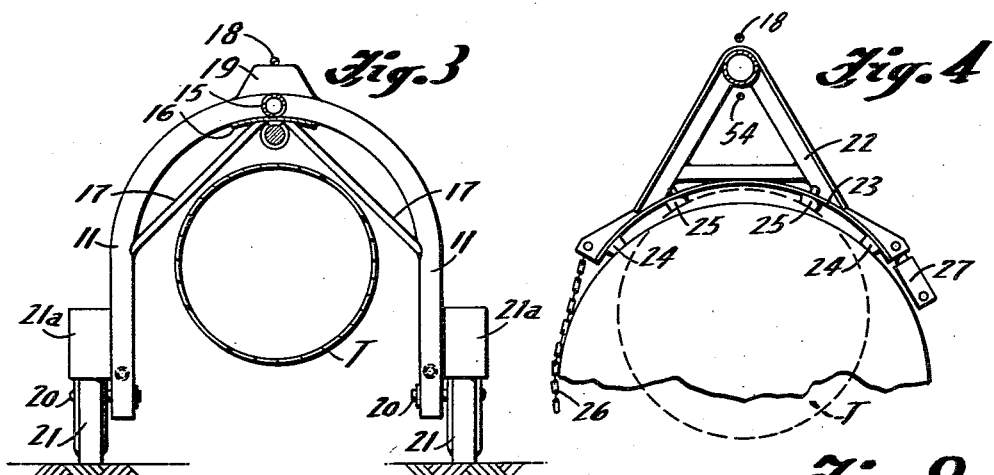
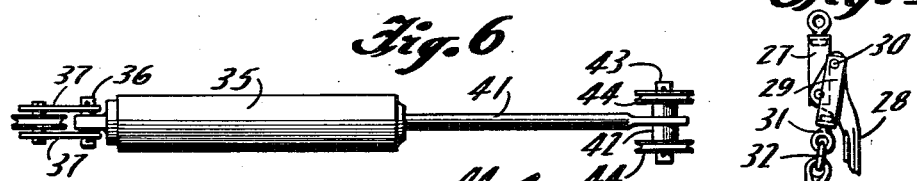
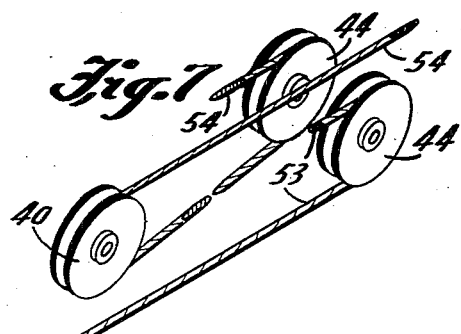
INVENTOR.
Glenn H. Buehring
BY Louis O. French
Atty.

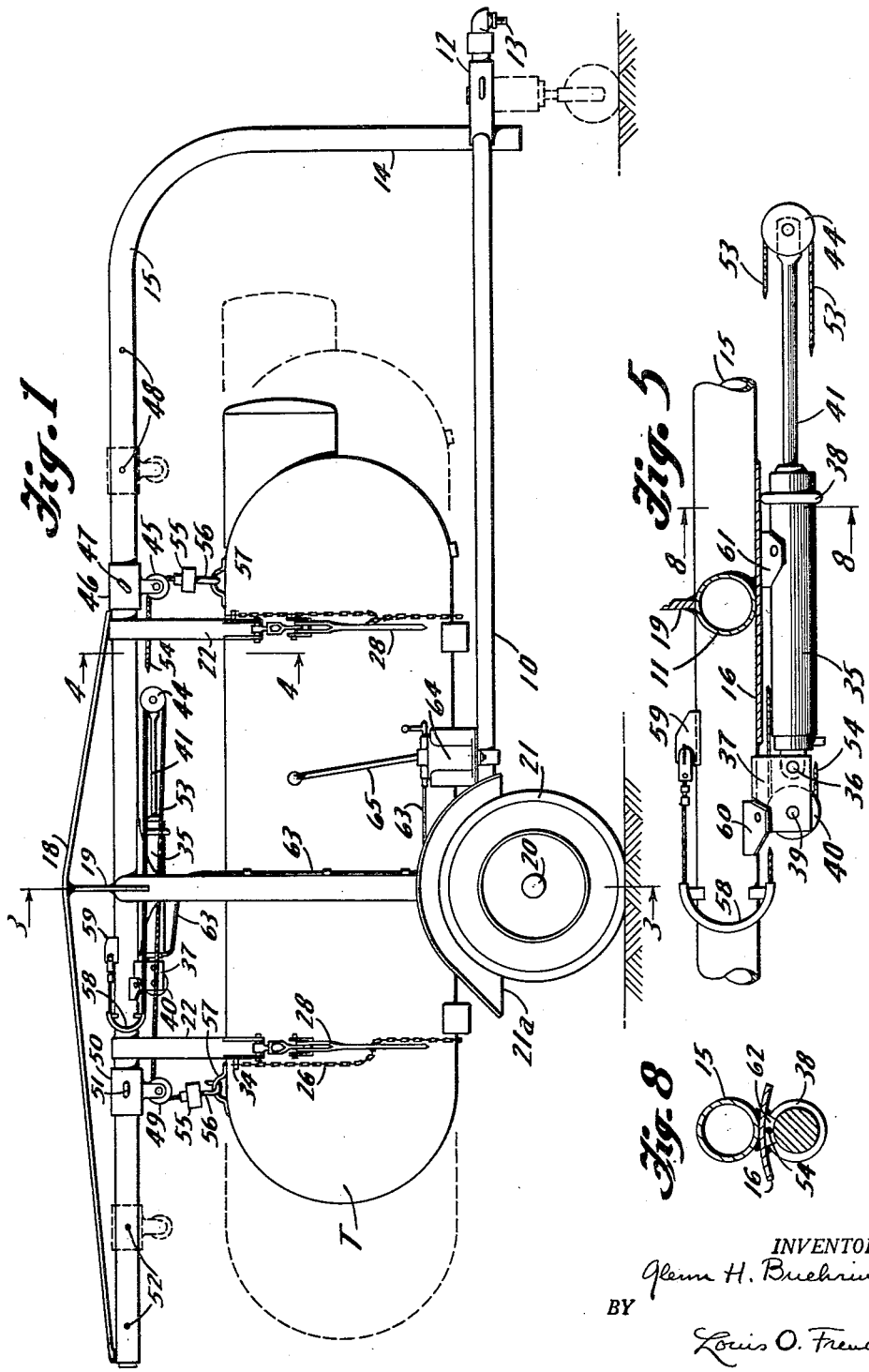
Nov. 27, 1956 — G. H. BUEHRING — 2,772,010
STORAGE TANK TRAILER
Filed Oct. 13, 1954 — 2 Sheets-Sheet 1
INVENTOR.
Glenn H. Buehring
BY Louis O. French
Att'y.

United States Patent Office 2,772,010
Patented Nov. 27, 1956

2,772,010

STORAGE TANK TRAILER

Glenn H. Buehring, Oshkosh, Wis.

Application October 13, 1954, Serial No. 462,034

1 Claim. (Cl. 214—394)

The invention relates to storage tank trailers.

The object of the invention is to provide a trailer adapted to carry large storage tanks such as heating gas tanks, of varying lengths and diameters and provided with means for raising and lowering the tank relative to the trailer at the place of use.

The invention further consists in the several features hereinafter set forth and more particularly defined by the claim at the conclusion hereof.

In the drawings:

Fig. 1 is a side elevation view of a trailer embodying the invention;

Fig. 2 is a plan view of the trailer;

Fig. 3 is a vertical sectional view taken on the line 3—3 of Fig. 1;

Fig. 4 is a detailed vertical sectional view taken on the line 4—4 of Fig. 1, parts being broken away;

Fig. 5 is an enlarged detailed sectional view taken on the line 5—5 of Fig. 2;

Fig. 6 is a detailed plan view of the hoist cylinder and its associated pulleys;

Fig. 7 is a view of the cable reeving:

Fig. 8 is a detailed sectional view taken on the line 8—8 of Fig. 5;

Fig. 9 is a detailed side elevation view of the chain clamp.

Referring to the drawings, the trailer includes a U-shaped side frame 10 whose legs are secured or joined at their rear ends to the lower ends of a vertically disposed arch member 11. The members 10 and 11 are formed from pipe sections, and the front of the frame 10 has a fitting 12 welded thereto and provided with a coupling or vehicle hitch 13. A heavy angled pipe 14 has a vertical leg anchored at its lower end in the fitting 12 and a horizontally extending leg 15 that is welded to the upper end of the arch member 11, and at their joints both the leg 15 and member 11 are welded to a reinforcing metal plate 16. The member 11 is also braced by diagonal brace rods 17, and the leg 15 is braced by a brace rod 18 welded at its ends to said leg and welded intermediate its ends to a tensioning plate 19 whose base edge is welded to the upper ends of the members 11. Each of the lower ends of member 11 carries a stub axle 20 on which is mounted a trailer wheel 21, and mud guards 21a are provided for these wheels.

Tank hangers or slings are mounted on the leg 15 of the pipe frame member 14 at spaced distance so as to suspend the tank T in the space formed by the arched frame construction above described. Each of the hangers includes a U-shaped frame 22 of T-iron welded to the leg 15 and secured to an arched or cylindrically curved bottom member 23 which has sets 24 and 25 of spaced tank contacting rubber pads. The frame 22 and member 23 form a yoke. The pads 24 are, as shown in full in Fig. 4, adapted to contact the outer wall of a large diameter tank while the pads 25 contact the outer wall of a smaller diameter tank T, as shown in dotted in this figure. A chain 26 is anchored at one end to one side of the yoke and is adapted to be passed around a portion of the tank body to an adjustable take up hitch with the other side of the yoke. Any suitable hitch may be used, and in Fig. 9 I have shown a link 27 pivotally connected at one end to the yoke and pivotally connected at its other end to one arm of a lever 28 whose other arm has a U-shaped toggle link 29 pivotally connected thereto at 30. The transverse portion of the link 29 has an eye 31 to receive a short chain section 32 carrying a hook 33 onto which the loose end of the chain 26 may be hooked before swinging the lever 28 to throw the link 29 over dead center to a locked position. The end portion of the free end of the chain may be anchored to a pin 34 on the yoke. The slings suspend the tank in a carrying position on the trailer after it has been raised to this position by the hoist mechanism now to be described.

A single acting hydraulic cylinder 35 is suspended beneath the leg 15 in the region of the arches 11, the back end of said cylinder being connected by a pin 36 to spaced anchor plates 37 anchored to said leg and the forward end of the cylinder extending through a split anchor ring 38 (see Figs. 5 and 8). The plates 37 also carry a shaft 39 for a pulley 40. The rod 41 of the piston working in the cylinder has a transverse portion 42 in which a shaft 43 for oppositely disposed pulleys 44 is journalled. A front pulley 45 is suitably pendantly mounted on a collar 46 slidable along the leg 15 and adapted to be secured in different lengthwise adjustments relative to said leg by a locking pin 47 which extends through apertures in said collar into any one of a series of spaced diametrically disposed holes 48 in said leg. A rear pulley 49 is suitably pendantly mounted on a collar 50 slidable along the leg 15 and adapted to be secured in different lengthwise adjustments relative to said leg by a locking pin 51 which extends through apertures in the collar into any one of a series of spaced diametrically disposed holes 52 in said leg.

There are two cables 53 and 54 each carrying a weight 55 and a hook 56 to engage an eyed fitting 57 secured on the end portions of the tank T, and there are three anchorage points for each cable. The cable 53 for the rear end of the tank extends over the rear pulley 49 out around one of the pulleys 44 and back around a curved guide channel 58 to an anchorage lug 59 on the frame for the size of tank shown. For longer tanks the anchorage lug 60 or 61 is used. The cable 54 for the front end of the tank passes over the front pulley 45 back over the pulley 40, thence forwardly along the top of the cylinder 35 through an opening 62 between the ends of the ring 38 and then over the other pulley 44 and back to an anchorage on the other side of leg 15 similar to the lug 59 and its guide channel 58 for the short length tank shown, other anchorages on the other side of the leg 15, similar to the lugs 60 and 61, being provided for this cable when handling longer tanks.

With the above described cable reeving introduction of hydraulic fluid in the back end of the cylinder 35 produces a forward movement of the pulley carrying ram or piston so that the length of cables 53 and 54 between the tank and the pulleys 49 and 45 is shortened, thus raising the tank. The cylinder 35 is supplied with fluid under pressure through a pipe line 63 connected with a pump 64, here shown as manually operated by a lever 65, the pump being provided with conventional valving which permits release of the fluid from the cylinder when it is desired to lower the tank upon its foundation and also the locking of the piston in its extended position while the chains 26 are being fastened around the tank for transporting it on the trailer.

For larger tanks than that shown the collars 46 and 50 are adjusted to other positions lengthwise along the leg 15, one of these positions being shown in dotted in Fig. 1, in which case the anchor lug 60 and its counterpart on the other side would be used.

I desire it to be understood that this invention is not to be limited to any particular form or arrangement of parts except in so far as such limitations are included in the appended claim.

What I claim as my invention is:

In a trailer, the combination of a two wheeled frame including spaced side members, an overhead lengthwise extending frame member centrally disposed relative to said side members and arched frame members connecting said side members to said overhead member, spaced tank slings mounted on said overhead frame member to hold a tank in a raised position, a hydraulic cylinder mounted on said overhead frame member and having a piston rod carrying spaced pulleys, a collar lengthwise adjustably mounted on said overhead frame member forwardly of said cylinder and carrying a pulley, a collar lengthwise adjustably mounted on said overhead frame member rearwardly of said cylinder and carrying a pulley, a pulley mounted at the rear of said cylinder, spaced cable anchorages on said overhead frame member, a cable connected to the rear end portion of the tank and extending over the pulley on said rearwardly disposed collar forwardly to one of said pulleys on said piston rod and then rearwardly to one of said cable anchorages, a cable connected to the forward end portion of said tank and extending over the pulley on said forwardly disposed collar rearwardly over said pulley at the rear of said cylinder, thence forwardly over the other of said pulleys in said piston rod, and then rearwardly to its anchorage, and means for supplying said cylinder with pressure fluid.

References Cited in the file of this patent

UNITED STATES PATENTS

| | | |
|---|---|---|
| 1,943,398 | Sargent | Jan. 16, 1934 |
| 2,404,898 | Aycock | July 30, 1946 |
| 2,433,822 | Bartholomew | Dec. 30, 1947 |
| 2,444,690 | Almendinger et al. | July 6, 1948 |
| 2,512,988 | Adams | June 27, 1950 |
| 2,540,803 | Alexander et al. | Feb. 6, 1951 |
| 2,545,088 | Johns et al. | Mar. 13, 1951 |
| 2,583,075 | Anderson et al. | Jan. 22, 1952 |